United States Patent [19]

Marple

[11] Patent Number: 4,775,804
[45] Date of Patent: Oct. 4, 1988

[54] RECONSTRUCTED CLOCK GENERATOR

[75] Inventor: Wendell P. Marple, Manassas, Va.

[73] Assignee: International Business Machines Corporation, Armonk, N.Y.

[21] Appl. No.: 113,797

[22] Filed: Oct. 27, 1987

[51] Int. Cl.⁴ .................... H03K 3/86; H03K 5/135; H03K 5/14

[52] U.S. Cl. ................... 307/269; 307/264; 307/268; 328/65; 328/164

[58] Field of Search ............... 307/264, 268, 269, 463; 328/63, 65, 74, 164

[56] References Cited

U.S. PATENT DOCUMENTS

| | | | |
|---|---|---|---|
| 3,093,798 | 6/1963 | Jacobsen | 328/65 |
| 3,202,838 | 8/1965 | Ryon, Jr. et al. | |
| 3,441,751 | 4/1969 | Benedict | |
| 3,562,558 | 2/1971 | Totten | 307/269 |
| 3,621,408 | 11/1971 | Kennedy | |
| 3,654,489 | 4/1972 | Knapton | |
| 3,656,009 | 4/1972 | Chen | |
| 4,229,666 | 10/1980 | Milburn, Jr. | |
| 4,459,701 | 7/1984 | Lamiral et al. | |
| 4,497,060 | 1/1985 | Yang | |

Primary Examiner—John Zazworsky
Attorney, Agent, or Firm—John E. Hoel

[57] ABSTRACT

The reconstructed clock generator instantly generates a data clock from existing serial data in any coding format which provides data transitions at a reasonable rate. The reconstructed clock waveform provides transitions at the original transmission clock frequency, occurring at the optimum sampling time for decoding the incoming serial data. An edge detector is used to produce pulses coincident with each transition of the data to be decoded. The output of the edge detector is connected to the input of an emitter follower whose output is connected to a transmission line whose propagation delay is equal to one-half of the period of the data transmission clock waveform. The pulse from the edge detector travels along the transmission line and arrives at the far end at exactly one-half clock period later, where it is reflected. The pulse is reflected from end to end of the transmission line in this manner, producing a stream of pulses with the period of the data transmission clock waveform, as desired. Pulses at the output end of the transmission line are delayed one-half of the period from those at the input end, making their rise time occur at the optimum data sampling point (midpoint of each data time slot). The output end of the transmission line is terminated with the current sink to provide bias current for the emitter follower. The pulse stream at the output of the transmission line is converted to usable logic levels by differentiating the output of the high input impedance buffer, to preserve the timing information without regard for amplitude, and converting this differentiated signal to logic levels with the converter containing a threshold detector with a small amount of hysteresis. The clock waveform from the converter can be used as the clock waveform into a serial-to-parallel converter for decoding the incoming serial data.

1 Claim, 3 Drawing Sheets

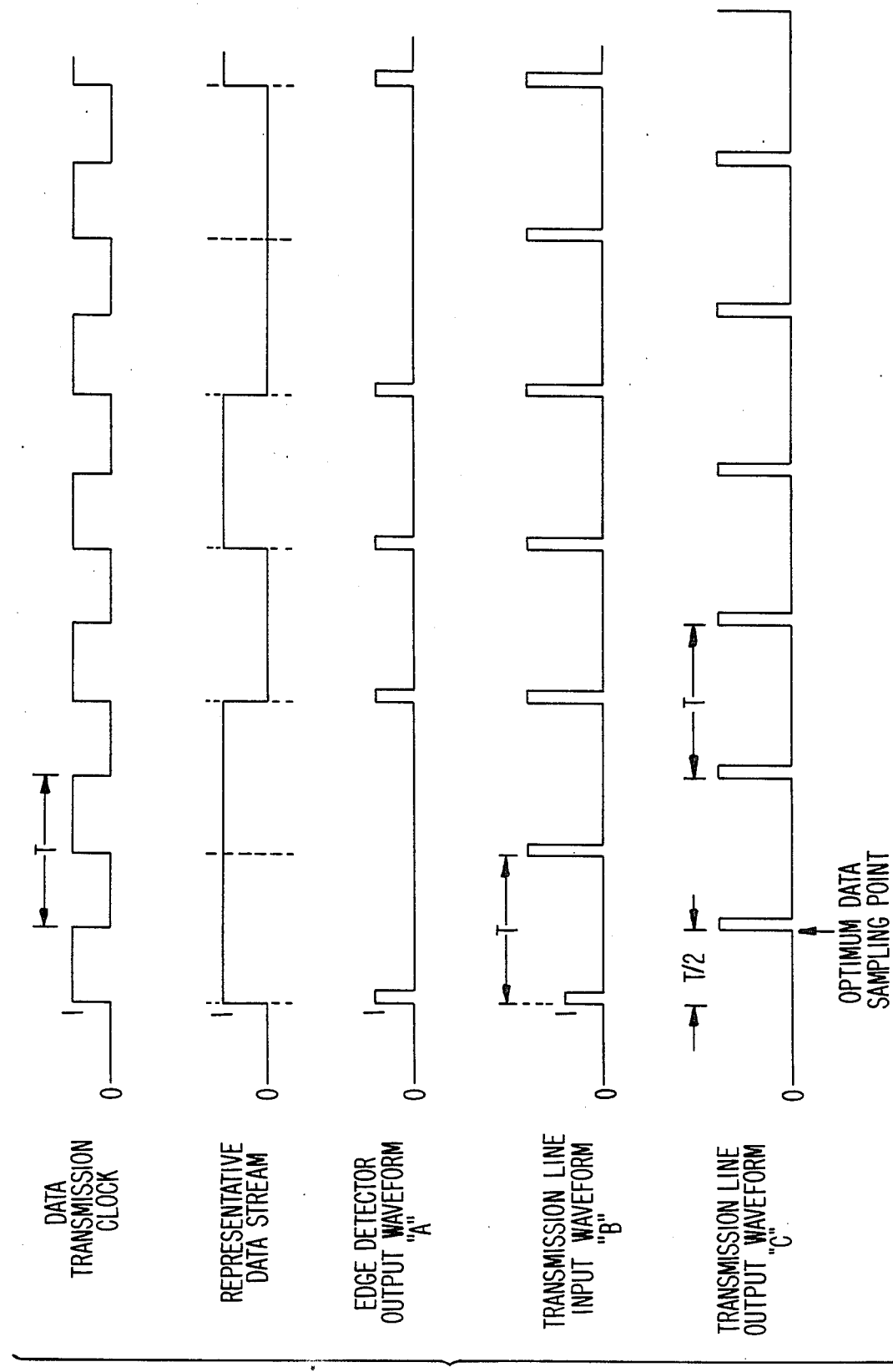

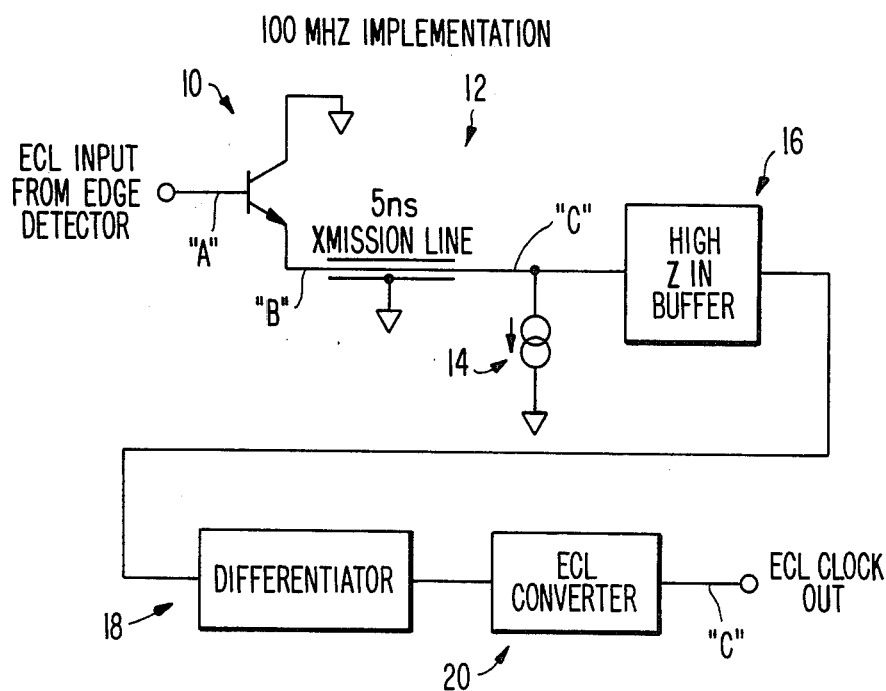
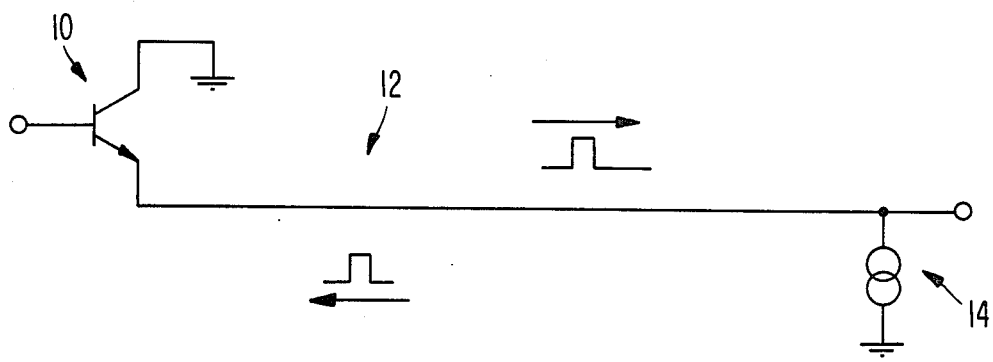

RECONSTRUCTED CLOCK GENERATOR

BACKGROUND OF THE INVENTION

1. Technical Field

The invention disclosed is broadly related to digital circuits and more particularly is directed to an improved technique for generating data clock waveforms.

2. Background Art

A common problem in decoding asynchronous serial data in communications links is that of reconstructing the original transmission clock for use in decoding the serial data stream. The most efficient serial coding schemes (i.e. NON-RETURN-TO-ZERO and its derivatives) are not self-clocking (do not contain the clock timing information in the data stream). A common approach in prior art is to utilize a voltage or current controlled oscillator as the reconstructed clock and to "phase lock" this oscillator to the incoming data stream via feedback from a phase comparison between the reconstructed clock and the incoming data. The disadvantages to this approach are that it takes a finite time to achieve "phase lock," a unique signature must be transmitted and decoded to indicate the "real" beginning of data, and clock timing can never be exact as some phase difference is necessary to maintain the error signal which tunes the oscillator.

OBJECTS OF THE INVENTION

It is therefore an object of the invention to provide an improved technique for decoding synchronous serial data.

It is another object of the invention to provide an improved technique for reconstructing the original transmission clock in data communications.

SUMMARY OF THE INVENTION

These and other objects, features and advantages of the invention are achieved by the reconstructed clock generator, disclosed herein. The reconstructed clock generator instantly generates a data clock from existing serial data in any coding format which provides data transitions at a reasonable rate. The reconstructed clock waveform provides transitions at the original transmission clock frequency, occurring at the optimum sampling time for decoding the incoming serial data. An edge detector is used to produce pulses coincident with each transition of the data to be decoded. The output of the edge detector is connected to the input of an emitter follower whose output is connected to a transmission line whose propagation delay is equal to one-half of the period of the data transmission clock waveform. The pulse from the edge detector travels along the transmission line and arrives at the far end at exactly one-half clock period later, where it is reflected. The pulse is reflected from end to end of the transmission line in this manner, producing a stream of pulses with the period of the data transmission clock waveform, as desired. Pulses at the output end of the transmission line are delayed one-half of the period from those at the input end, making their rise time occur at the optimum data sampling point (midpoint of each data time slot). The output end of the transmission line is terminated with the current sink to provide bias current for the emitter follower. The pulse stream at the output of the transmission line is converted to usable logic levels by differentiating the output of the high input impedance buffer, to preserve the timing information without regard for amplitude, and converting this differentiated signal to logic levels with the converter containing a threshold detector with a small amount of hysteresis. The clock waveform from the converter can be used as the clock waveform into a serial-to-parallel converter for decoding the incoming serial data.

BRIEF DESCRIPTION OF THE DRAWINGS

These and other objects, features and advantages of the invention will be more fully appreciated with reference to the accompanying figures.

FIG. 1 is a timing diagram illustrating the operation of the invention.

FIG. 2 is a schematic diagram illustrating the principal elements of the invention.

FIG. 3 is a schematic diagram illustrating the polarity of the transmitted and reflected pulses on the transmission line.

DESCRIPTION OF THE BEST MODE FOR CARRYING OUT THE INVENTION

Figure 4:
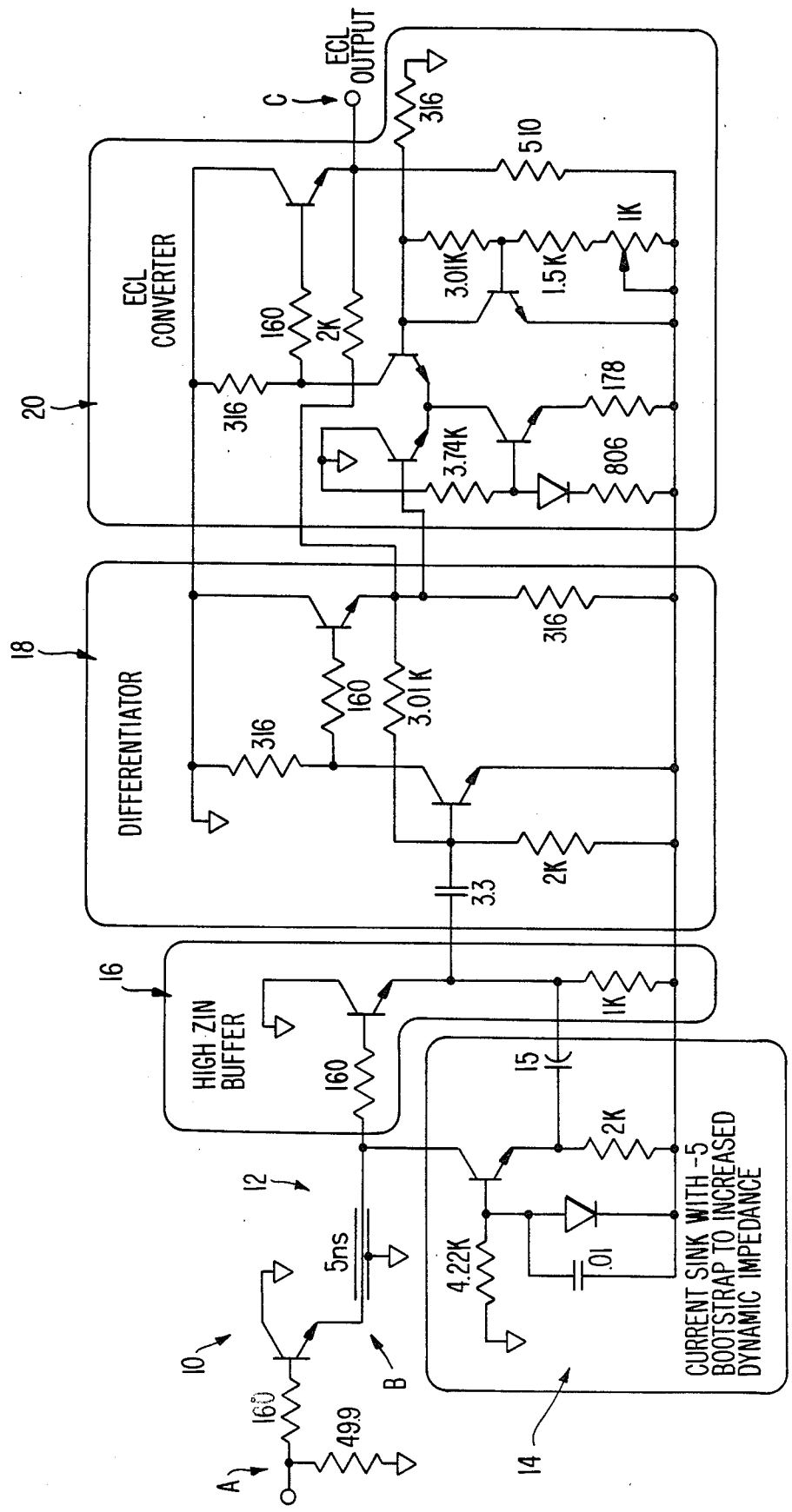
FIG. 4 is a detailed schematic diagram of the invention.

A conventional edge detector such as that described in U.S. Pat. No. 4,698,528 to W. P. Marple and H. A. Miller, assigned to IBM Corporation, is used to produce pulses coincident with each transition of the data to be decoded. The edge detector output waveform A of FIG. 1 is connected to the input of an emitter follower 10 of FIG. 2 whose output is connected to a transmission line 12 with propagation delay equal to one-half the period of the data transmission clock. Note that the emitter follower presents no load to reflected pulses in the transmission line. The pulse from the edge detector at B in FIGS. 1 and 2 travels along the transmission line and arrives at the far end exactly one-half clock period later where it is reflected at C in FIGS. 1 and 2. The pulse is reflected from end to end of the transmission line in this manner producing a stream of pulses with period (T) of the data transmission clock. The pulses at the output end of the data transmission line are delayed one-half T from those at the input end, making their rise time occur at the optimum data sampling (the midpoint of each data time slot). The output end of the transmission line is terminated with a current sink 14 to provide bias current for the emitter follower. Note that for ideal components, the pulses will continue to be reflected indefinitely. In practice however, the transmission line has some inherent loss and the output buffer 16 absorbs a small amount of the pulse energy. Hence the amplitude of the pulse train decreases with time. In the model built (100 MHz implementation), the pulses remained at a usable amplitude for 200-250 nanoseconds or for 20 to 25 clock periods. Thus it is necessary to assure that the data changes at least this often to renew the pulse stream. The pulse stream at the output of the transmission line is converted to usable logic levels by differentiating with a differentiator 18 the output of the high input impedance buffer (to preserve timing information regardless of amplitude) and converting this differentiated signal to logic levels with a converter 20 containing a threshold detector with a small amount of hysteresis. The hysteresis also prevents output switching in the absence of pulses. The clock from the converter can now be used as the clock to a serial-to-parallel converter to decode the incoming serial data.

The model was built using a short length of coaxial cable for the delay line and ECL (emitter coupled logic) levels were used because of the speed required. Other applications may indicate other types of delay elements and/or different logic levels. Also diode coupling may be used in lieu of the emitter follower.

FIG. 3 shows how the delay line produces reconstructed clock pulses on its own after being stimulated by one input pulse from the emitter follower. The sole purpose of the high input impedance buffer and following circuitry is to convert the voltage pulses at the end of the delay line into a usable logic signal without greatly disturbing these pulses in the delay line.

Referring to the schematic diagram of the invention of FIG. 4, the high input impedance buffer 16 (high Zin buffer) consists of a conventional emitter follower whose output feeds the differentiator 18 which consists of a conventional trans impedance amplifier stage AC coupled to the buffer output with a very small (3.3 pF) capacitor. The differentiator output drives the threshold detector/level converter 20 which consists of a conventional differential amplifier with emitter follower output which is biased to provide ECL levels. A small amount of hysteresis is provided by the 2K resistor which is connected from the output to the input of the differential amplifier.

In summary, the invention provides a technique for reconstructing a clock signal from a serial data stream using a transmission line. An edge detector is used to produce pulses coincident with each transmission of the data to be decoded. The output of the edge detector is connected to an input of an emitter follower whose output is connected to a transmission line. The transmission line has a propagation delay which is equal to one-half of the period of the data transmission clock waveform. A pulse from the edge detector travels along the transmission line and arrives at opposite ends thereof, exactly one-half of a clock period later. The pulse is being reflected between the ends of the transmission line in a manner which produces a stream of pulses with a period T of the data transmission clock. The pulse stream at the putput of the transmission line is converted to usable logic levels by differentiating the output of the high input impedance buffer and converting the differentiated signals to logic levels with a converter containing a threshold detector having a small amount of hysteresis. The output of the converter is used as a clock signal for a serial-to-parallel converter in order to decode the incoming serial data stream.

Although a specific embodiment of the invention has been disclosed, it will be understood by those having skill in the art that minor changes can be made to the specific embodiment without departing from the spirit and the scope of the invention.

What is claimed is:

1. A circuit for reconstructing a clock signal from an input serial data stream, comprising:
   an emitter follower circuit having an input connected to a source of pulses coincident with each transmission of data to be decoded, and an output;
   a transmission line having an input connected to said output of said emitter follower circuit, said transmission line having a propagation delay which is substantially equal to one-half of the period of the data transmission clock waveform for said input data stream;
   said transmission line propagating a pulse received from said source, said pulse arriving at the opposite end of said transmission line at substantially one-half of said clock period thereafter, said pulse then being reflected at said opposite end of said transmission line and subsequently being reflected between opposed ends of said transmission line, thereby producing a sequence of pulses with a period substantially equal to said period of said data transmission clock waveform;
   converter means connected to said opposite end of said transmission line to convert said reflected pulses to usable logic levels;
   whereby the clocking signal from said input data stream can be reconstructed.

* * * * *